No. 618,356. M. C. JOHNSON. Patented Jan. 24, 1899.
BICYCLE.
(Application filed Mar. 30, 1897.)
(No Model.) 2 Sheets—Sheet I.
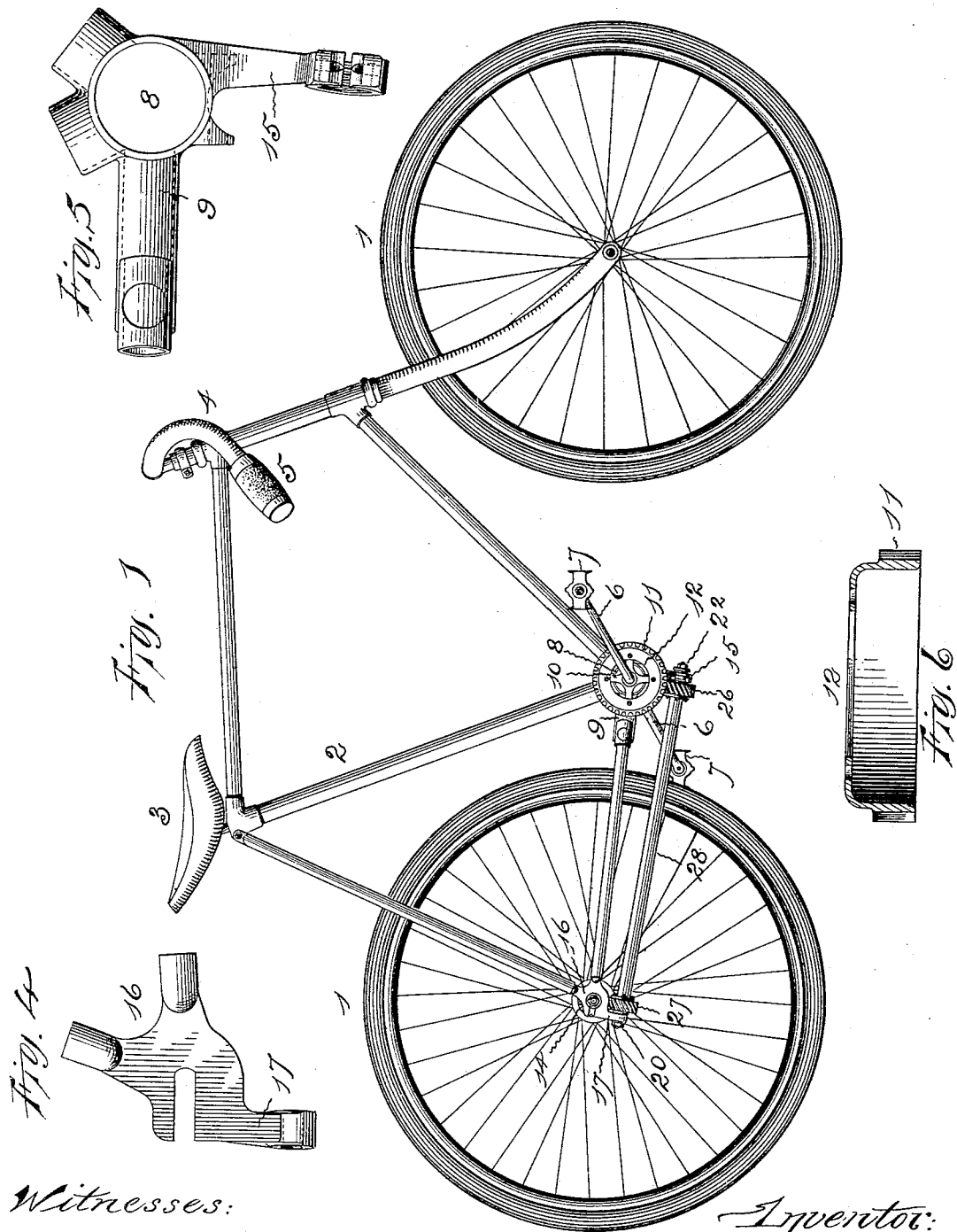
Witnesses:
E. J. Hyde.
E. W. Fothergill.
Inventor:
Moses C. Johnson by
Harry P. Williams
atty.

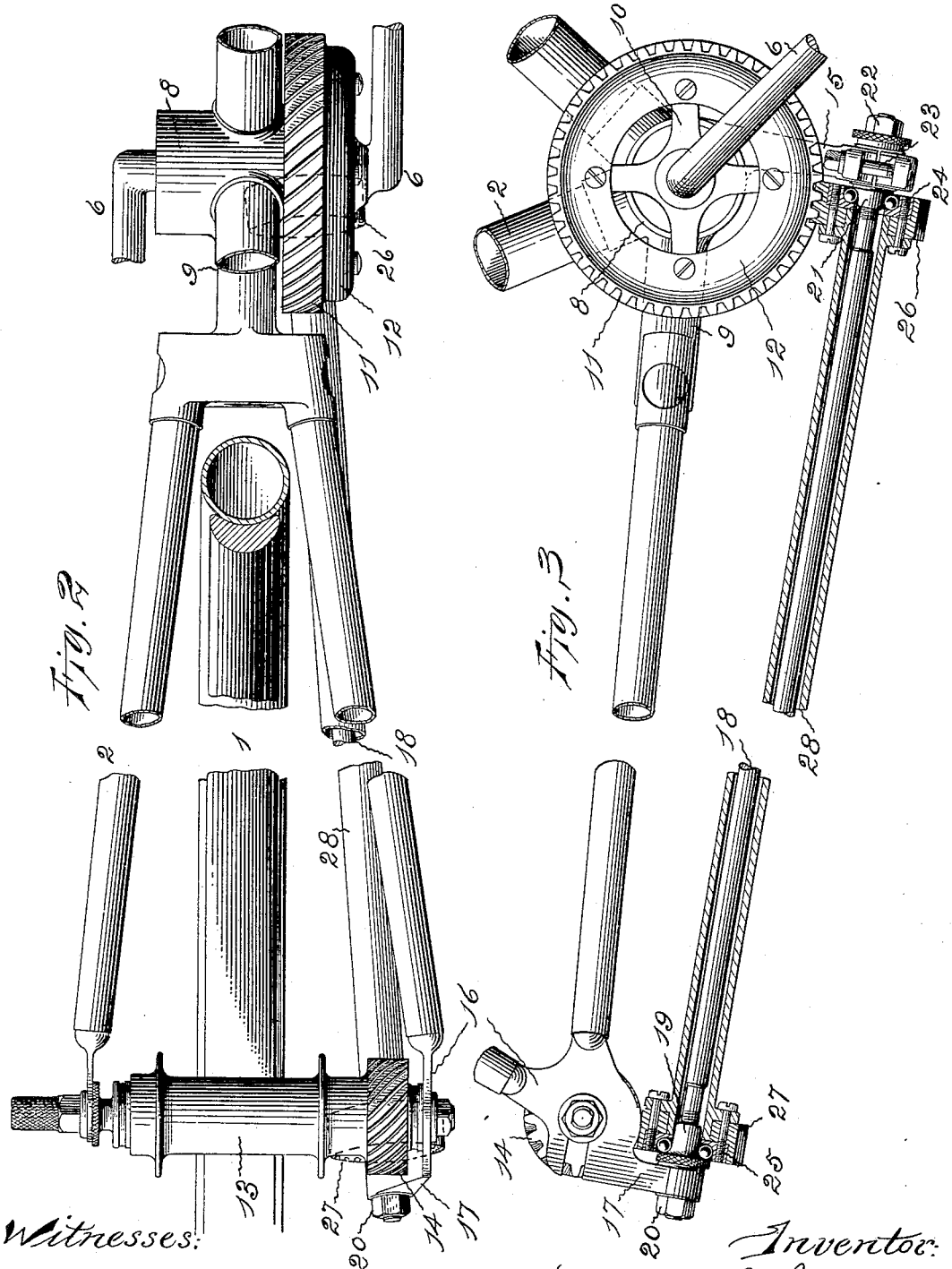

UNITED STATES PATENT OFFICE.

MOSES C. JOHNSON, OF HARTFORD, CONNECTICUT.

BICYCLE.

SPECIFICATION forming part of Letters Patent No. 618,356, dated January 24, 1899.

Application filed March 30, 1897. Serial No. 629,978. (No model.)

*To all whom it may concern:*

Be it known that I, MOSES C. JOHNSON, a citizen of the United States, residing at Hartford, in the county of Hartford and State of Connecticut, have invented certain new and useful Improvements in Bicycles, of which the following is a specification.

My invention relates to that class of bicycles having intermeshing gears and connecting-shafts for transmitting power from the pedal-cranks to the driving-wheels and known to the trade as "chainless" bicycles.

Heretofore in all bicycles of the type mentioned with which I am familiar great difficulty has been caused by the binding or cramping of the gears when the frame of the machine has become bent or deflected, either temporarily or permanently, when the bearings or gears have been imperfectly adjusted, displaced, or worn, or when the shaft has become sprung or damaged, and many devices have been invented for overcoming these defects; but thus far they have either not worked satisfactorily or have been of such complication as to add to the weight of the structure and to increase the expense in the manufacture thereof.

My invention has for its object the provision of gearing so combined and arranged that it will automatically accommodate itself to any change or deflection of the yielding frame of the bicycle or to any defect in adjustment of the bearings or imperfect action of the shaft and which will always keep in proper mesh without binding or cramping, no matter what may be the defect caused by strains or otherwise.

In the organization of my invention I preferably employ spiral or screw-like gears having teeth which intermesh with a rolling action, said teeth being so disposed that each tooth acts as a short section of a spiral of proper pitch, which section will engage without undue friction a corresponding tooth or section of the intermeshing gear and will operate thereon with a rolling action. In this embodiment of my invention the teeth of the gears are of the same pitch and of the same inclination, and they are so disposed that should the frame of the bicycle become bent or distorted, and thus be thrown out of its normally correct position, the gears will move upon each other and still keep in proper mesh, notwithstanding the changed form which has just been mentioned in the machine-frame.

While my invention is shown as embodied in a gear of spiral form—in other words, a gear the teeth of which constitute sections of spirals of somewhat quick pitch—yet it is to be distinctly understood that it is not limited thereto, as I consider within the purview of my invention any and all gears of screw or spiral form which while intermeshing to produce a bicycle driving-gear yet will accommodate themselves to strains or deflections of the bicycle-frame or other parts without binding or friction, and will consequently run as easily and as well in one position as in another. Therefore, while the form illustrated is preferable and works admirably in practice without apparent friction, yet other forms of gearing of the same or analogous types could be employed and would work fairly well under similar conditions.

In the accompanying drawings, Figure 1 is a side elevation of a bicycle embodying the invention. Fig. 2 is an enlarged plan of a portion of the frame and the driving mechanism. Fig. 3 is a side view of these parts with portions cut in section to show the construction. Fig. 4 is a detail side view of a forging used at the driving-wheel corner of the frame. Fig. 5 is a detail side view of the forging used at the crank corner of the frame, and Fig. 6 is a sectional view of the spiral gear that is connected with the crank-shaft.

Like numerals refer to like parts throughout the several views.

The wheels of the bicycle shown are of common construction, and upon them in the usual manner by ordinary antifriction-bearings is supported the frame 2, of any approved design, that is provided with a desirable saddle 3, a proper handle-bar 4, and comfortable handles 5. The cranks 6, bearing the pedals 7, are connected by a shaft which is supported upon ball-bearings in the usual manner in the barrel 8 of the forging 9, that is secured to the ends of the frame-tubes between the wheels. Connected with the crank-shaft is a plate 10, and attached by arms to this plate is a spiral gear 11. The teeth of this gear are arranged to form small portions of spirals or short sections of screw-threads of quick pitch on the periphery of the cup-shaped part 12.

Attached to the hub 13 of the rear or driving wheel is a spiral gear 14, the teeth of which are arranged to form small portions of spirals or short sections of screw-threads of quick pitch on the periphery of one end of the hub.

Projecting downwardly from the forging 9 between the wheels is an arm 15, and projecting downwardly from the forging 16, that is held by the axle of the driving-wheel, is an arm 17. These arms are connected by a tie 18. Turning on a thread cut on this tie inside of the arm 17 is a ball-cone 19, and outside of this arm the tie is provided with a holding-nut 20. Turning on a thread cut on the other end of this tie and fitting a threaded opening in the arm 15 is a ball-cone 21, while outside of this latter cone a holding-nut 22 is secured. The arm 15 is split and provided with a binding-bolt 23 for clamping the ball-cone in position after it has been adjusted.

Balls are placed between the ball-cones 19 and 21 and the ball-caps 24 and 25 in the spiral pinions 26 and 27, and these spiral pinions are connected by a shaft 28. Screws are passed through the flanges of this shaft and the spiral pinions and ball-caps for securing these parts together, and the shaft which connects the spiral pinions so extends in the form illustrated that the upper teeth of the spiral pinions mesh with the lower teeth of the spiral gears.

The teeth of the spiral pinion 26 are arranged as small portions of spirals or short sections of screw-threads on the same angle as the teeth of the spiral gear 11, with which they mesh, and the teeth of the spiral pinion 27 are arranged as small portions of spirals or short sections of screw-threads on the same angle as the teeth of the spiral gear 14, with which they mesh. All of the teeth of the spiral gears and spiral pinions are pitched to the same angle and in the same direction. These spiral gears and spiral pinions are not worms and worm-wheels, nor are they spur-gears with angularly-arranged teeth. The teeth of the spiral gears and spiral pinions are all formed the same and are small portions of spirals or short sections of screw-threads of quick pitch, and all portions of each pitch-line of all of the teeth of each of these spiral gears and spiral pinions are equally distant from their axes of rotation. The teeth of the spiral gears are not concaved, as are the teeth of worm-wheels.

The spiral pinions 26 and 27, which are permanently connected with the shaft 28, turn freely upon the balls that are supported by the ball-cones on the tie 18. The tie is permanently connected with the arm 17 of the forging 16 by the end of the ball-cone 19 and the nut 20 and is adjustably connected at the other end with the arm 15 of the forging 9 by the ball-cone 21 and nut 22. When the binding-bolt 23 is loosened, the ball-cone 21 can be turned to take up all wear, and when the bolt is tightened and the nut is turned up the ball-cone and tie are secured in position, and this ties the arms of the forgings together.

The rotation of the spiral gear 11 that is imparted by the rotation of the cranks is transmitted to the connected spiral pinions 26 and 27 and from these transmitted through the spiral gear 14 to the hub of the driving-wheel.

Usually the employment of spiral gears for transmitting motion from one shaft to another shaft extending at right angles thereto results in such an amount of end thrust and in so much friction that in light-running machines their use is precluded. In the light-running machine embodying this invention the arrangement of spiral gears and spiral pinions is such that the end thrust given by the spiral gear 11 to the spiral pinion 26 is toward the spiral pinion 27, and the resistance to end thrust of the spiral gear 14 against the spiral pinion 27 is toward the spiral pinion 26. Thus the end thrusts of these parts are in directions toward each other and to a great extent counteract each other in such manner as to practically eliminate all the effect of end thrust. The end thrust in one direction is greater than in the other only as one spiral gear is larger than the other, and this small difference is borne by the balls, which sustain the end thrust as well as support the spiral pinions. This balancing of the end thrust also permits the use of light supporting-brackets and dispensing with the tie, if desired, for there is no tendency to force the brackets apart.

With bevel-gears and bevel-pinions, also with worm-wheels and worms, if the frame that supports them becomes bent, so that the axes of the pinions or worms are out of line with the axes of the gears or worm-wheels, or if the pinions or worms are drawn away from the axes of the gears or worm-wheels, or if the pinions or worms become twisted out of the correct alinement, the teeth will not properly mesh and will so bind as to cause much friction and jamming.

The pitch-lines of the teeth of bevel-gears and bevel-pinions must all converge to a common center, which is the intersection of their axes. If the supports of bevel-gears or bevel-pinions or if the frame which bears the supports springs and becomes out of line in the least, the pitch-lines of the teeth of the bevel-gears and bevel-pinions will not converge to the necessary point and there will be friction and wear, if not jamming and collapse. If the axis of a worm is carried to one side of the plane of rotation of the middle of the teeth of the worm-wheel, there will be binding and wear, if not jamming and total stoppage.

With the arrangement of spiral gears and spiral pinions illustrated herein the teeth of the spiral pinions will mesh with the teeth of the spiral gears and drive without slip—that is, they can be made to engage with an exceedingly small amount of friction—and they will intermesh and run just as freely if under any accidental stress the spiral pinions are drawn out of their normal positions toward or from each other or if the spiral pinions are not properly adjusted on the tie. The spiral pinions will mesh with the spiral gears and run just as freely if the teeth of the spiral pinions are forced more or less to either side of the plane of rotation of the center of the teeth of the spiral gears or if forced from normal position nearer to or away from the axes of the spiral gears, so that if the frame of the bicycle becomes slightly sprung or bent, or the pinion-connecting shaft becomes twisted or damaged, or the crank-shaft or hub of the driving-wheel becomes dislocated, or the bearings get out of adjustment, or the teeth of the spiral pinions or spiral gears become worn this driving mechanism will operate to transmit power from the pedals to the driving-wheel without necessitating an increase of effort above that required when the parts are in their normal alinement and adjustment.

The spiral pinions may be located above, so as to mesh with the tops of the spiral gears, instead of being below and meshing with the bottoms of the spiral gears, and the tie may be placed outside instead of inside the shaft or even dispensed with, if desired, without departing from the invention.

It is unnecessary to employ a tie, as the bearings will support the shaft and spiral gears sufficiently, owing to the lack of end thrust with this form of spiral gears and pinions. These spiral gears and spiral pinions are simple to form, and they are readily applied without adding to the weight of the bicycle. They can be applied in a neat and attractive manner without materially increasing the ordinary spread of the frame or increasing the distance between the cranks, and they can be inclosed in dust-proof caps or oil-cases, if desired. A bicycle provided with this style of driving mechanism will be very durable, for the wearing of the gears and pinions and all small twists or bends or any ordinary spreading or yielding of the frame will not affect the transmission of power from the cranks to the driving-wheel, which transmission of power by this form of spiral gears and spiral pinions, arranged to eliminate end thrust, is accomplished with practically no loss.

The machine embodying this invention and having the enumerated characteristics and advantages can be manufactured for less comparative cost than any other form of machine now in use because of the elimination of the requirement of accuracy of construction and adjustment of the driving mechanism.

I claim as my invention—

1. In a bicycle, in combination, a pair of wheels, a frame supported by the wheels, a pair of pedal-cranks and a crank-shaft held by the frame between the wheels, a spiral gear connected with the crank-shaft, a spiral gear connected with the hub of one of the wheels, a spiral gear in mesh with the spiral gear connected with the crank-shaft, a spiral gear in mesh with the spiral gear connected with the hub of one of the wheels, and a shaft connecting the intermediate spiral gears whereby rotary motion imparted to the crank-shaft spiral gear is transmitted to the wheel-hub spiral gear, substantially as specified.

2. In a bicycle, in combination, a pair of wheels, a frame supported by the wheels, a pair of pedal-cranks and a crank-shaft held by the frame between the wheels, a spiral gear having peripheral teeth arranged as short portions of spirals of quick pitch connected with the crank-shaft, a spiral gear with like teeth connected with the hub of the rear wheel, a tie and a shaft supported by the frame and extending one within the other, a spiral pinion having peripheral teeth arranged as short portions of spirals of quick pitch connected with the shaft near one end and meshing with the peripheral teeth of the spiral gear connected with the crank-shaft, and a spiral pinion with like teeth connected with the shaft near the other end and meshing with the peripheral teeth of the spiral gear connected with the hub of the rear wheel, substantially as specified.

3. In a bicycle, in combination, a pair of wheels, a frame supported by the wheels, a pair of pedal-cranks and a crank-shaft supported by the frame between the wheels, a spiral gear connected with the crank-shaft, a spiral gear connected with the hub of the driving-wheel, and a pair of spiral pinions connected together by a hollow shaft and supported by bearings upon a rod that passes through the hollow shaft in such manner that their teeth mesh with the teeth of the spiral gears, substantially as specified.

4. In a bicycle, in combination, a pair of wheels, a frame supported by the wheels, a pair of pedal-cranks and a crank-shaft supported by a frame between the wheels, a spiral gear connected with the crank-shaft, a spiral gear connected with the hub of the driving-wheel, a spiral pinion meshing with the spiral gear at the crank-shaft, a spiral pinion meshing with the spiral gear at the driving-wheel hub, a hollow shaft connecting the spiral pinions, a rod passing through the hollow shaft, said rod bearing ball-cones and being connected outside of the ball-cones with arms projecting from portions of the frame, and balls located between the spiral pinions and the ball-cones, substantially as specified.

5. In a bicycle, in combination, a pair of wheels, a frame supported by the wheels, a pair of pedal-cranks and a crank-shaft supported by the frame between the wheels, a spiral gear connected with the crank-shaft, a spiral gear connected with the hub of the driving-wheel, a spiral pinion meshing with the spiral gear at the crank-shaft, a spiral pinion meshing with the spiral gear at the driving-wheel hub, a hollow shaft connecting the spiral pinions, a rod extending through the hollow shaft and through arms projecting from portions of the frame, said rod bearing near each end a ball-cone, one of said ball-cones being threaded and free to turn in a threaded opening in the arm, a binding-bolt for clamping the threaded ball-cone in position, and balls between the ball-cones and the spiral pinions, substantially as specified.

6. In a bicycle, in combination, a pair of wheels, a frame supported by the wheels, a pair of pedal-cranks and a crank-shaft supported by the frame between the wheels, a spiral gear connected with the crank-shaft, a spiral gear connected with the hub of the driving-wheel, an extension of the frame projecting below the axis of the crank-shaft, an extension of the frame projecting below the axis of the driving-wheel, a shaft supported by bearings in the extensions below the axes of the crank-shaft and driving-wheel, and a pair of spiral pinions attached to the shaft and having their peripheral teeth meshing with the peripheral teeth of the spiral gears that are pitched to the same angle, substantially as specified.

7. In a bicycle in which the rear road-wheel is the driving-wheel and is driven by gearing between the wheel and the front wheel, a drive-gearing consisting of a pair of screw gear-wheels at the pedal-crank axle; a pair of similar screw gear-wheels at the rear driven-wheel axle; and a shaft at the side of the bicycle-frame, carrying the driven wheel of the front pair and the driving-wheel of the rear pair, the said shaft being supported from the frame of the machine.

8. In a bicycle, the combination, with the frame, wheels, and pedal-shaft, the pedal-shaft and hub of one of the wheels having screw or spiral gears thereon, of a shaft carried by the frame and having screw or spiral gears thereon which mesh with the gears on the pedal-shaft and wheel-hub the pitch of the screw-gears being in the same direction whereby motion is communicated from one of said parts to the other and end thrusts of the gears are eliminated, substantially as and for the purpose specified.

MOSES C. JOHNSON.

Witnesses:
H. R. WILLIAMS,
E. W. FOTHERGILL.